United States Patent
McHugh et al.

(10) Patent No.: US 11,634,271 B2
(45) Date of Patent: Apr. 25, 2023

(54) BEVERAGE CARTRIDGE FOR BEVERAGE MAKING MACHINES

(71) Applicant: Keurig Green Mountain, Inc., Burlington, MA (US)

(72) Inventors: William Philip McHugh, Foxborough, MA (US); Aaron Size, Waltham, MA (US); Heather Fisher, Somerville, MA (US); Thomas Fedorka, Billerica, MA (US)

(73) Assignee: Keurig Green Mountain, Inc., Burlington, MA (US)

( * ) Notice: Subject to any disclaimer, the term of this patent is extended or adjusted under 35 U.S.C. 154(b) by 622 days.

(21) Appl. No.: 16/336,585

(22) PCT Filed: Sep. 12, 2017

(86) PCT No.: PCT/US2017/051124
§ 371 (c)(1),
(2) Date: Mar. 26, 2019

(87) PCT Pub. No.: WO2018/063791
PCT Pub. Date: Apr. 5, 2018

(65) Prior Publication Data
US 2019/0225414 A1 Jul. 25, 2019

Related U.S. Application Data

(60) Provisional application No. 62/400,713, filed on Sep. 28, 2016.

(51) Int. Cl.
*A47J 31/40* (2006.01)
*B65D 85/80* (2006.01)
*B65D 85/804* (2006.01)

(52) U.S. Cl.
CPC ........ *B65D 85/8043* (2013.01); *A47J 31/407* (2013.01); *B65D 85/804* (2013.01)

(58) Field of Classification Search
CPC . A47J 31/407; B65D 85/8043; B65D 85/804; B65D 85/8046; B65D 85/8049; B65D 85/8052; B65D 85/8055
See application file for complete search history.

(56) References Cited

U.S. PATENT DOCUMENTS

| 4,136,202 A | 1/1979 | Favre |
| 5,897,899 A | 4/1999 | Fond |

(Continued)

FOREIGN PATENT DOCUMENTS

| WO | WO 2014/057098 A1 | 4/2014 |
| WO | WO 2016/014562 A1 | 1/2016 |
| WO | WO 2018/007383 A1 | 1/2018 |

OTHER PUBLICATIONS

International Search Report and Written Opinion dated Dec. 21, 2017 in connection with International Application No. PCT/US2017/051124.

(Continued)

*Primary Examiner* — Ericson M Lachica
(74) *Attorney, Agent, or Firm* — Wolf, Greenfield & Sacks, P.C.

(57) ABSTRACT

A beverage cartridge and method for forming a beverage includes dispensing beverage material from a container into an attached mixing funnel. The container and mixing funnel may be moved toward each other to open the container and release beverage material. A cover of the container may have a movable portion that moves with contact with a part of the mixing funnel to open the container. The cartridge may be vibrated to dispense beverage material from the container, (Continued)

and liquid provided to the mixing funnel to mix with dispensed beverage material to form a beverage.

15 Claims, 3 Drawing Sheets

(56) References Cited

U.S. PATENT DOCUMENTS

| | | | |
|---|---|---|---|
| 2003/0205591 A1 | 11/2003 | Garcia et al. | |
| 2004/0191372 A1* | 9/2004 | Halliday | A47J 31/0673 426/112 |
| 2008/0216666 A1* | 9/2008 | Doglioni Majer | B65D 85/8043 99/295 |
| 2011/0142996 A1* | 6/2011 | Kruger | B65B 29/022 426/80 |
| 2012/0006204 A1* | 1/2012 | Eidenschink | A47J 31/407 99/279 |
| 2012/0052163 A1* | 3/2012 | Doleac | B65D 85/8058 426/112 |
| 2012/0210878 A1* | 8/2012 | Mariller | A47J 31/3623 99/295 |
| 2012/0308688 A1* | 12/2012 | Peterson | A47J 31/44 426/86 |
| 2014/0356484 A1* | 12/2014 | Capitani | B65D 85/8043 426/77 |
| 2015/0150409 A1* | 6/2015 | Cross | B65D 85/8043 426/112 |
| 2015/0166258 A1 | 6/2015 | Gruder | |
| 2015/0289708 A1* | 10/2015 | Ezaz-Nikpay | B65D 85/8052 426/115 |
| 2016/0206134 A1* | 7/2016 | Frazer | A47J 31/0631 |

OTHER PUBLICATIONS

International Preliminary Report on Patentability dated Apr. 11, 2019 in connection with International Application No. PCT/US2017/051124.

Partial Supplementary European Search Report dated May 8, 2020 in connection with European Application No. 17857185.7.

* cited by examiner

BEVERAGE CARTRIDGE FOR BEVERAGE MAKING MACHINES

RELATED APPLICATIONS

This application is a national stage filing under 35 U.S.C. § 371 of International Application No. PCT/US2017/051124, filed Sep. 12, 2017, which claims the benefit of U.S. Provisional Application No. 62/400,713, filed Sep. 28, 2016, each of which is herein incorporated by reference in its entirety.

BACKGROUND

1. Field of Invention

This invention relates to a beverage cartridge to be used with a beverage forming system, such an infant formula or other beverage machine.

2. Related Art

Cartridges for use with beverage forming machines are well known, and may include a variety of different beverage materials, such as ground coffee beans, tea leaves, powdered drink mix, powdered infant formula, etc.

SUMMARY OF INVENTION

In one aspect, a beverage cartridge includes a cup defining an opening to an internal space for containing a beverage material used to make a beverage, such as a powdered infant formula that is mixed with water. The cup may include an outwardly extending rim arranged around the opening that has a top side and a bottom side. A cover may close the opening and engage with the rim to seal the internal space from an external environment, e.g., to protect a beverage material in the cup from moisture, oxygen, etc. The cover may include a body having a periphery and a plurality of flexible tabs arranged around the periphery of the cover. The cover may be positioned below the cup and the flexible tabs may be arranged to engage the top side of the rim and bias the cover against the rim, e.g., so that rim and cover form a seal. In some embodiments, the flexible tabs may be arranged as finger-shaped elements with each flexible tab forming a cantilever that is attached at a proximal end to the body and extending away from the proximal end to a free distal end. The cantilever may have a rod-like or beam-like shape such that the cantilever is elongated, e.g., the cantilever is longer than it is wide.

In one embodiment, the cover includes a peripheral lip that extends upwardly from the body around the periphery, and the flexible tabs extending downwardly and inwardly from the peripheral lip. In some cases, the flexible tabs are arranged to flex outwardly to receive the rim into a space between the flexible tabs and the body. Thus, to engage the rim with the cover, the rim may need to be forced past the flexible tabs, which flex to allow the rim to pass and then elastically recover to trap the rim in place. The cartridge may also include a sealing boss on the rim or the body of the cover to seal the internal space closed. For example, the sealing boss may include a resilient, gasket-type element the deforms with engagement between the rim and cover and provides the seal.

In one embodiment, the body includes a movable portion located between two stationary portions. The movable portion may be joined to the stationary portions by respective break lines that are arranged to open with movement of the movable portion relative to the stationary portions. For example, the movable portion may be pressed to move towards the internal space of the cup so as to move relative to the stationary portions. This movement may cause the break lines to open, creating one or more openings into the internal space. Beverage material in the internal space may exit the cartridge via the one or more openings, e.g., by falling due to gravity from the openings. In some cases, the break lines may include perforations, scoring or thinned sections of the body so that movement of the movable portion causes the perforated, scored or thinned sections to break or separate to form the one or more openings. The movable portion may extend across the body from one side of the periphery to another side of the periphery. For example, the body may be circular, and the movable portion may extend across the circular shape from one side to the other, e.g., the movable portion may include a diameter line that extends through a center of the circular shape. The break lines may also extend across the body from one side of the periphery to another side of the periphery, e.g., the break lines may form a type of chord line that extends across a circular shape of the body. The break lines may terminate short of the periphery such that the movable portion remains attached to the body after the break lines are open. For example, if the body has a circular shape, the break lines may extend close to, but up to, the outer circular periphery of the body.

In another aspect, a beverage cartridge includes a cup defining an opening to an internal space for containing a beverage material used to make a beverage. The cup may include a rim arranged around the opening, a sidewall that extends downwardly from the rim, and a bottom at a lower end of the sidewall. A cover may be arranged to close the opening and engage with the rim to seal the internal space from an external environment, such as moisture, oxygen, etc. The cover may be positioned below the cup and have a body with a periphery engaged with the rim, a movable portion extending across the body from one side of the periphery to another side of the periphery, and at least two stationary portions on opposite sides of the movable portion. The movable portion may be joined to the stationary portions by respective break lines arranged to open with movement of the movable portion relative to the stationary portions. For example, the movable portion may extend across a center of the body and may be pushed to move toward the internal space of the cup, causing the break lines to open and allow beverage material to exit the cartridge. In some cases, a central area of the movable portion may be wider than ends of the movable portion that are nearer the periphery.

In some embodiments, the cover includes a peripheral lip arranged to engage with the rim to hold the cover on the cup and that extends upwardly from the body around the periphery. The break lines, which may include perforations, scoring or thinned sections of the body, may extend across the body from one side of the periphery to another side of the periphery, but may terminate short of the periphery such that the movable portion remains attached to the body after the break lines are open.

In another aspect, a mixing funnel for use with a beverage cartridge includes a funnel body defining a bowl portion having a sidewall and a bottom. The bottom may include an outlet opening, and the sidewall may have a rim at an upper end of the sidewall and a gap at a portion of the sidewall. An inlet channel may extending radially outwardly from the gap and be arranged to receive liquid into the inlet channel in an axial direction and to direct the liquid into the bowl portion such that the liquid enters the bowl portion and follows an arcuate pathway around the bowl portion. That is, the rim of the bowl portion may define an upper opening of the funnel body, and the inlet channel may provide a radial extension from the upper opening. Water of other liquid may enter the inlet channel in a downward direction (an axial direction), and then flow generally horizontally (a radial direction) into the funnel body so that the liquid swirls around the bowl portion. Such swirling flow may aid in mixing of the liquid with a beverage material in the bowl portion. The mixing funnel may be arranged to engage with a beverage material container at the rim of the sidewall and to receive a beverage material from the beverage material container into the bowl portion, e.g., so that beverage material dispensed from the container into the bowl portion can mix with water or other liquid provided to the inlet channel. The beverage material container may be positioned over the bowl portion so that when the container is opened, beverage material drops from the container into the bowl portion.

In some embodiments, the funnel body includes a spike that extends upwardly from the bottom of the bowl portion and is arranged to contact and open the beverage material container. For example, the beverage material container may include a piercable or otherwise openable section located over the spike, and the spike and container may be movable towards each other so that the spike causes the beverage material container to open, releasing beverage material. In some cases, the mixing funnel is arranged to engage the beverage material container and to move toward the beverage material container while remaining engaged with the beverage material container such that the spike opens the beverage material container. That is, the beverage material container and the mixing funnel may be forced towards each other so that the spike contacts the beverage material container and causes the container to open.

The mixing funnel may have different features to aid in mixing, exit of beverage from the funnel or other features. For example, the outlet opening may be offset from a center of the bowl portion. That is, the bowl portion may be generally symmetrical with a circular cross section that allows fluid to flow in a circular path in the bowl portion. However, the outlet opening may be offset from center of the bowl portion, which has been found to aid in beverage exiting the bowl portion, e.g., by reducing splashing at the outlet. In some embodiments, the inlet channel has a U shape when viewed from a top side, e.g., to provide a smooth flow path and transition for liquid that enters the inlet channel to the bowl portion. In some cases, the inlet channel has a bottom that is positioned above the bottom of the bowl portion, e.g., so that liquid in the inlet channel can flow downwardly into the bowl portion to drain the inlet channel.

In one embodiment, the rim of the bowl portion includes a stepped portion arranged to receive the beverage material container. For example, the stepped portion may form an internal ledge or shelf below the top edge of the rim. A portion of the beverage material container may be received into the stepped portion so that the container can move toward the mixing funnel while remaining positioned at least partially in the stepped portion. In some cases, the stepped portion is arranged to engage the beverage material container at a first position and at a second position, where the beverage material container is positioned further within the bowl portion in the second position than in the first position. As noted above, the funnel body may include a spike that extends upwardly from the bottom of the bowl portion, and if so, may be arranged to contact and open the beverage material container when the beverage material container is moved from the first position to the second position. The stepped portion may be configured to function as a stop to limit movement of the beverage material container into the bowl portion.

In another aspect, a beverage cartridge includes a beverage material container having a beverage material in an internal space and being arranged to be opened to release the beverage material, and a mixing funnel attached to the beverage material container and arranged to receive beverage material released from the beverage material container and to receive liquid that is mixed with the beverage material in the mixing funnel. The beverage material container and the mixing funnel may be movable towards each other while remaining attached together so as to open the beverage material container and release the beverage material into the mixing funnel. For example, the beverage material container may be partially received into the mixing funnel when moving toward the mixing funnel to open the beverage material container.

In some embodiments, the beverage material container includes a cover with one or more break lines, and the mixing funnel includes a pusher element arranged to contact the cover and cause the one or more break lines to open with movement of the beverage material container toward the mixing funnel. The mixing funnel may include a bowl portion with a bottom and a sidewall and the pusher element may extend upwardly from the bottom to contact the cover of the beverage material container. In one embodiment, the cover includes a movable portion located between two stationary portions with the movable portion joined to the stationary portions by respective break lines arranged to open with movement of the movable portion relative to the stationary portions. The pusher element may be arranged to contact and move the movable portion with movement of the beverage material container towards the mixing funnel.

In one arrangement, the beverage material container is movable relative to the mixing funnel from a first position in which the internal space is closed to a second position in which the internal space is opened to release the beverage material. The beverage cartridge may include a detent that operates to maintain the beverage material container at the first position in the absence of an external force, and permits the beverage material container to move to the second position only if an external force applied to the beverage material container and mixing funnel exceeds a threshold. In some cases, the threshold is 10 pounds, e.g., a suitable level to help prevent unwanted opening of the container during shipping and other handling of the cartridge prior to use. Once the beverage material container is opened, the beverage material container and the mixing funnel may be arranged to be vibrated to dispense beverage material from the beverage material container and into the mixing funnel.

In another aspect, a beverage dispensing system includes a beverage cartridge having a beverage material container with a beverage material in an internal space, and a mixing funnel attached to the beverage material container and arranged to receive beverage material released from the beverage material container and to receive liquid that is mixed with the beverage material in the mixing funnel. A beverage making machine may have a cartridge holder arranged to receive the beverage cartridge with the cartridge holder including a vibration mechanism arranged to vibrate the beverage cartridge and cause beverage material to be dispensed from the beverage material container into the mixing funnel once the beverage material container is opened.

In one embodiment, the vibration mechanism includes a yoke that extends at least partially around the beverage material container and transmits vibratory motion to the beverage material container. In some cases, the yoke may include an annular ring that extends around the beverage material container, although other configurations are possible. The vibration mechanism may include a motor that moves the yoke in a horizontal plane, e.g., the vibration mechanism may include a motor with an eccentric drive linked between the motor and the yoke.

In addition to being able to vibrate the beverage cartridge, e.g., while dispensing liquid into the mixing funnel to mix with the beverage material, the cartridge holder may be arranged to move the beverage material container and the mixing funnel toward each other to open the beverage material container and dispense beverage material into the mixing funnel. The cartridge holder may be arranged to hold the beverage cartridge in an orientation with the beverage material container positioned over the mixing funnel such that beverage material dispensed from the beverage material container falls into the mixing funnel.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
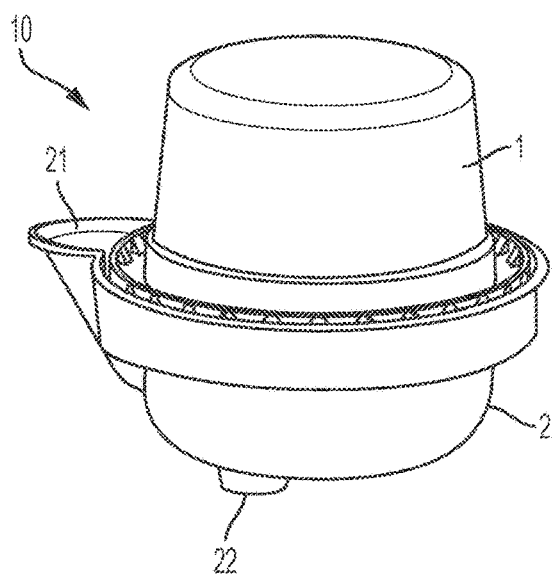
FIG. 1 is a perspective view of a beverage cartridge in an illustrative embodiment.
Figure 2:
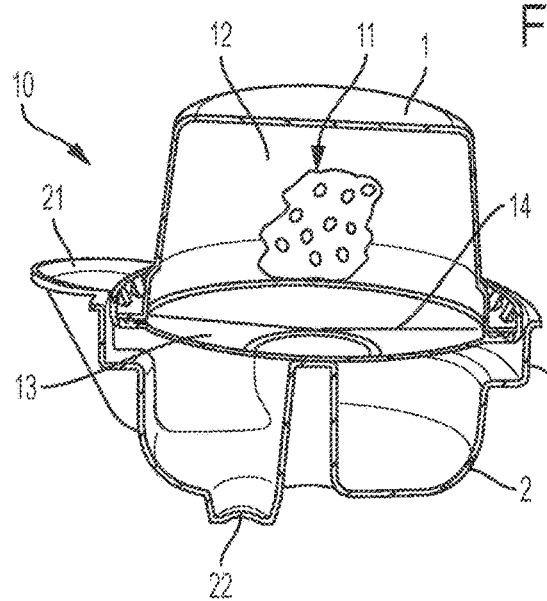
FIG. 2 is a side cross-sectional view of the cartridge of FIG. 1 with the beverage material container in a closed state.
Figure 3:
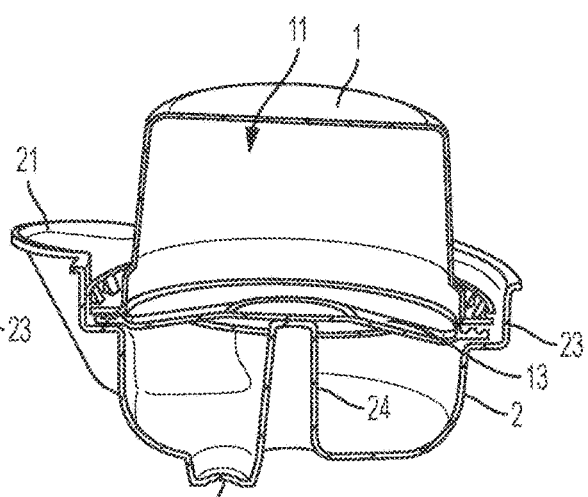
FIG. 3 is a side cross-sectional view of the cartridge of FIG. 1 with the beverage material container in an open state.

FIGS. 1-3 show a perspective view and side cross-sectional views, respectively, of an illustrative cartridge 10 that incorporates one or more aspects of the invention. The cartridge 10 may be used in a beverage machine to form any suitable beverage such as tea, coffee, and other beverages, including beverages formed from a liquid or powdered concentrate, etc. Thus, the cartridge 10 may contain any suitable beverage material, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriceuticals, etc.), and/or other beverage-making material (such as powdered milk or other creamers, sweeteners, thickeners, flavorings, and so on). In one illustrative embodiment, the cartridge 10 contains a beverage material that is configured for use with a machine that forms coffee and/or tea beverages, however, aspects of the invention are not limited in this respect. An arrangement like that in FIGS. 1-3 has been found particularly effective for use with a dry, powdered infant formula composition. For example, arrangements like that in FIGS. 1-3 have been found to be capable of consistently solubilizing spray dried powders that are highly soluble (like dairy powders and infant formula) without the need for secondary processing. Powders intended to be solubilized are typically processed, sometime at great expense, to optimize their rate solubility to achieve a more complete wetting of the powder. For highly soluble materials like infant formula or dairy powders, these can be processed through granulation techniques like agglomeration or roller compaction to slow the rate at which they take on water or other liquid. This is because particles which are highly soluble can wet too quickly at the bulk powder/water interface and form a viscous front that prevents further wetting of powder below. This can lead to the formation of non-solubilized globules of powder in the finished beverage, commonly known as "fish eyes". Embodiments described below allow a highly soluble, dry material such as spray-dried dairy powder or infant formula to be metered or otherwise dispensed into a liquid in a way that prevents the formation of a viscous front and thus creating a more uniform solution in the final beverage. This result can be achieved without the need or expense of secondary processing, such as agglomeration, to manipulate the particle size of the powder.

In this illustrative embodiment, the cartridge 10 includes a beverage material container 1 and a mixing funnel 2. Generally speaking, beverage material 12 (shown schematically in FIG. 2 but otherwise omitted for clarity) in an internal space 11 of the beverage material container 1 may be dispensed into the mixing funnel 2 and mixed with liquid, such as water. In this embodiment, the beverage material container 1 may be opened to dispense beverage material 12 into the mixing funnel 2, and liquid provided to the mixing funnel 2 at an inlet channel 21 may mix with the beverage material 12 to form a beverage that exits via an outlet opening 22. In the case of a dry or powdered beverage material 12, the material 12 may fall from the container 1 into the mixing funnel 2 to be mixed with liquid in the funnel 2. Liquid to be mixed with the material 12 may be sprayed or otherwise dispensed into the open area at the top of the inlet channel 21.

One feature of this embodiment is that no part of a beverage machine that uses the cartridge 10 need be exposed to, or contact, beverage material 12 in the container 1. Instead, the container 1 may be opened by a part of the mixing funnel 2 and beverage material 12 may be dispensed only into the mixing funnel 2, which may be later discarded or cleaned and reused. Also, the beverage machine using the cartridge 10 may dispense liquid into the inlet channel 21 without contacting the mixing funnel 2 or any other part of the cartridge 10, and the beverage produced in the mixing funnel 2 may be dispensed directly into a user's cup or other container. These features can help avoid contamination of the beverage machine because contact with the beverage material 12 can be avoided, thereby eliminating the need to clean or disinfect the machine after beverage formation.

In accordance with an aspect of the invention, the beverage material container 1 and the mixing funnel 2 may be arranged to be moved towards each other while remaining attached together so as to open the beverage material container 1 and release the beverage material 12 into the mixing funnel 2. That is, prior to use, the beverage material container 1 may be sealed closed with beverage material 12 contained inside the container 1 and isolated from external environmental conditions, such as moisture, oxygen, etc. The beverage material container 1 and mixing funnel 2 may be attached together prior to use, e.g., at the time or manufacture, so that a user need not associate a container 1 and funnel 2 together prior to use. Instead, the user may provide the cartridge 10 assembly as one piece to a beverage machine, which may receive the cartridge 10 and open the beverage material container 1 by moving the beverage material container 1 and mixing funnel 2 towards each other. Such an arrangement may provide for simplified operation, e.g., because cartridge holders in beverage machines are typically made to clamp a beverage cartridge and such clamping action may cause the beverage material container 1 to be opened.

Figure 4:
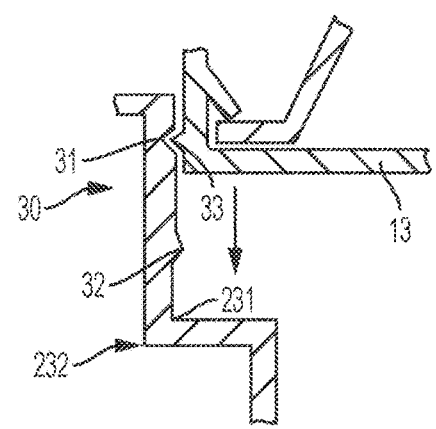
FIG. 4 shows a detent structure used to engage the beverage material container and mixing funnel in an illustrative embodiment.

In this embodiment, the beverage material container 1 includes a cover 13 with one or more break lines 14, and the mixing funnel 2 includes a pusher element 24 arranged to contact the cover 13 and cause the one or more break lines 14 to open with movement of the beverage material container 1 toward the mixing funnel 2. For example, the beverage material container 1 may be movable relative to the mixing funnel 2 from a first position in which the internal space 11 is closed to a second position in which the internal space 11 is opened to release the beverage material 12. The beverage material 12 may be released by causing the one or more break lines 14 to open, allowing the beverage material 12 to fall into the mixing funnel 2. In this embodiment, the beverage material container 1 may be received at least partially into the mixing funnel 2 when moving toward the mixing funnel 2. For example, the mixing funnel 2 may include a stepped portion 23 configured to receive the lower portion of the beverage material container 1 (i.e., the cover 13) and may function as a stop to limit movement of the beverage material container 1 into the mixing funnel 2. As shown in the zoomed-in view of the stepped portion 23 in FIG. 4, the stepped portion 23 may be arranged to allow the beverage material container 1 to be moved into the mixing funnel 2 until the cover 13 of the beverage material container 1 contacts a horizontal step or ledge 231 of the mixing funnel 2 which stops further motion of the beverage material container 1.

In some embodiments, the beverage cartridge 10 may include a detent that operates to hold the beverage material container 1 and the mixing funnel 2 together and to maintain the beverage material container 1 at the first position in the absence of an external force. However, the detent may permit the beverage material container 1 to move to the second position if an external force applied to the beverage material container 1 and mixing funnel 2 exceeds a threshold. For example, this embodiment includes a detent 30 that includes an upper circumferential notch 31 and a lower circumferential protrusion 32 at the stepped portion 23 and a protrusion 33 on the cover 13. With the beverage material container 1 in the first position shown in FIG. 4, the protrusion 33 on the cover 13 engages with the notch 31 to maintain the beverage material container 1 in the first position until a force exceeding a threshold (such as 10 pounds of force) is exerted on the beverage cartridge 1 to move the beverage material container 1 and the mixing funnel 2 towards each other. In the presence of such a force over the threshold, the protrusion 33 disengages from the notch 31 and the beverage material container 1 moves toward the mixing funnel 2 until the protrusion 33 clears, or moves below, the protrusion 32 on the stepped portion 23. In this embodiment, the cover 13 then contacts the step or ledge of the mixing funnel 2 and stops movement toward the mixing funnel 2. With the protrusion 33 positioned below the protrusion 32, the protrusions 32, 33 may be arranged to prevent movement of the beverage material container 1 and the mixing funnel 2 away from each other in the absence of a suitable threshold force exerted to separate the beverage material container 1 and the mixing funnel 2. Such a suitable threshold force may be greater than a threshold force needed to move the beverage material container 1 from the first position, e.g., may be 15 pounds or greater. Such an arrangement may provide a ready indication that the cartridge 10 has been used, e.g., because a user may view the cartridge 10 and see that the container 1 is received into the mixing funnel 2 and therefore has been used. Alternately, or in addition, a beverage machine that uses the cartridge 10 may detect that no force is needed to move the beverage material container 1 and the mixing funnel 2 toward each other, and associate this lack of force with an indication that the cartridge 10 has already been used. The machine may refuse operation in such a case, and/or provide a display to a user with a suitable message.

As discussed above, with the beverage material container 1 in the second position, the internal space 11 may be opened so that beverage material 12 may exit the container 1. In this embodiment, the pusher element 24 contacts a movable portion of the cover 13 so that the movable portion of the cover 13 moves relative to one or more stationary portions of the cover 13. Movable and stationary portions of the cover 13 may be arranged in a variety of different ways. For example, the pusher element 24 may include a spike that penetrates a part of the cover, moving portions of the cover 13 so as to form an opening in the cover 13 while other portions of the cover 13 are not contacted or moved by the pusher element 24. In other embodiments, the pusher element 24 may break one or more portions of the cover 13 free so as to create one or more openings through which beverage material may exit the internal space 11. In this illustrative embodiment, the cover 13 includes a movable portion that spans across the cover 13 and is movable relative to stationary portions on opposite sides of the movable portion. Break lines 14 between the movable portion and the stationary portions release when the pusher element 24 moves the movable portion upwardly as shown in FIG. 3, creating openings through which beverage material 12 may exit.

Figure 5:
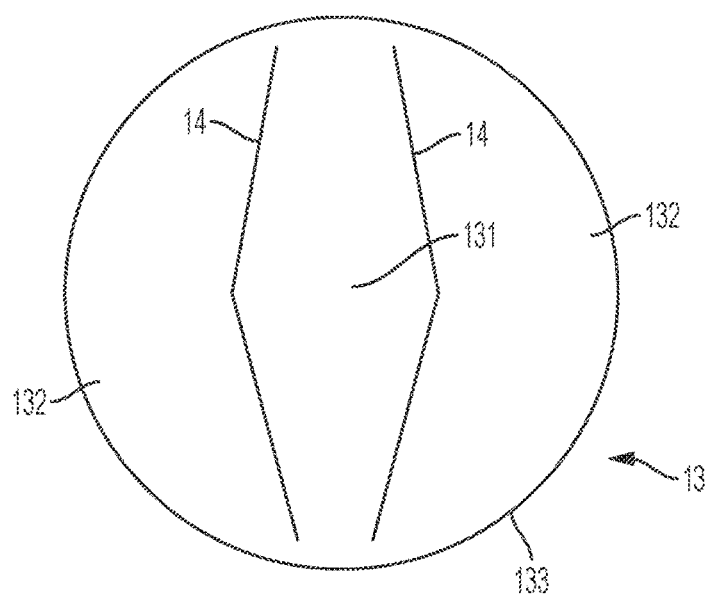
FIG. 5 shows a bottom view of the cover of the beverage material container in one embodiment.
Figure 6:
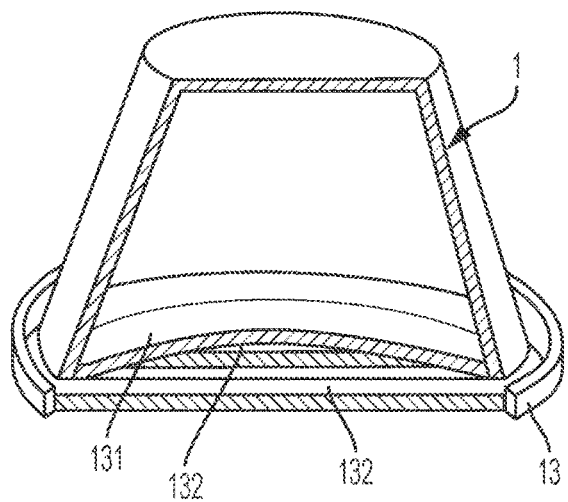
FIG. 6 shows a cross-sectional side view of the beverage material container illustrating the movable portion of the cover in an open position.

FIG. 5 shows a bottom view of the cover 13 in this embodiment and illustrates break lines 14 that are provided between the movable portion 131 and stationary portions 132 on opposite sides of the movable portion 131. Thus, the movable portion 131 is located between two stationary portions 132, and the movable portion 131 is joined to the stationary portions 132 by respective break lines 14 arranged to open with movement of the movable portion 131 relative to the stationary portions 132. That is, the pusher element 24 may contact and move the movable portion 131 upwardly relative to the stationary portions 132 and into the internal space 11 of the container 1 with movement of the beverage material container 1 towards the mixing funnel 2, as shown in FIGS. 3 and 6. The break lines 14 may include perforations, scoring or thinned sections of the body of the cover 13. In some embodiments, the cover 13 may include a relatively thin membrane, such as a polymer sheet, that is adhered to or molded with the body of the cover 13. Other areas of the cover 13 away from the break lines 14 may be thicker or otherwise more resistant to tearing or breaking. Thus, the membrane may be arranged to tear or rip when the movable portion 131 is moved relative to the stationary portions 132, e.g., with contact by the pusher element 24. In this embodiment, the movable portion 131 is wider in a center area than in outer, peripheral ends of the movable portion 131. This arrangement has been found to aid in opening of the break lines 14 (e.g., by initially concentrating breaking force at the center area) and provides a larger opening area than if the break lines 14 were straight. In this embodiment, the movable portion 131 extends across the body of the cover 13 from one side of a periphery 133 of the cover 13 to another side of the periphery 133, and may extend across a center of the body. Similarly, the break lines 14 may extend across the body from one side of the periphery 133 to another side of the periphery 133. For example, the break lines 14 may form chord lines, whether straight, curved or irregular in shape, that extend across the body of the cover 13. However, the break lines 14 may terminate short of the periphery 133 such that the movable portion 131 remains attached to the body after the break lines 14 are open. Of course, the movable portion may be arranged in other ways, and there may be two or more movable portions, and/or one or more stationary portions. For example, there may be three or more movable portions that extend radially inwardly from the periphery 133 toward a center of the body of the cover 13, and the cover may be arranged such that only a single stationary portion is provided. The movable portions may have a triangular, semi-circular or other desired shape, and may be arranged to detach completely or partially from the stationary portion via break lines 14. In the case of partial detachment, the movable portions may pivot about a hinge portion arranged adjacent the periphery 133 so that the movable portions can hinge upwardly and into the internal space 11 when opening in a way similar to the FIGS. 3 and 6 embodiment. A pusher element 24 may be arranged to individually contact the movable portions to cause the break lines 14 to separate, move the movable portions and create desired openings in the cover 13.

Figure 7:
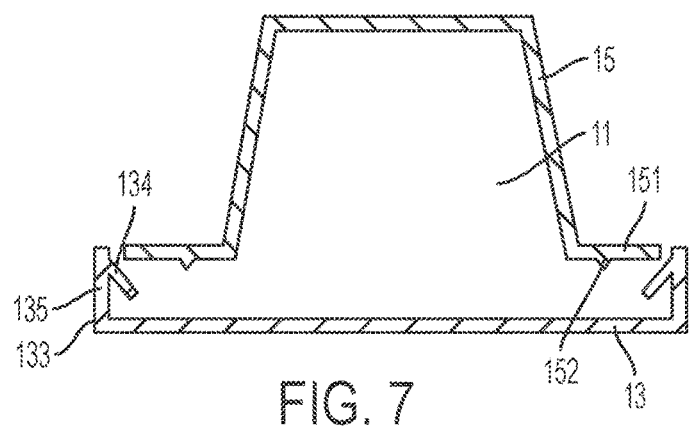
FIG. 7 shows a cross-sectional side view of the beverage material container with the cover disengaged from a cup of the container.
Figure 8:
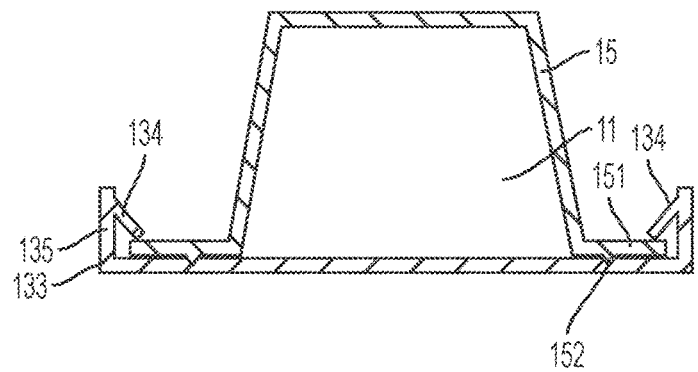
FIG. 8 shows a cross-sectional side view of the beverage material container of FIG. 7 with the cover engaged with the cup of the container.

In accordance with another aspect of the invention, the beverage material container may include a cover that engages with a cup of the container without the use of adhesive or welding. In some embodiments, the cover may include locking elements that engage with the cup and hold the cover in place, and the cover may sealingly engage with the cup so as to seal the internal space of the container closed to protect the beverage material from external conditions, such as moisture, oxygen, etc. For example, as shown in FIGS. 7 and 8, the beverage material container 1 may include a cup defining an opening to the internal space 11 for containing beverage material used to make a beverage. The cup 15 may include an outwardly extending rim 151 arranged around the opening that has a top side and a bottom side. The bottom side may include a sealing boss 152 extending downwardly from the bottom side. The cover 13 may be arranged to close the opening and engage with the sealing boss 152 to seal the internal space from an external environment. For example, the cover 13 may include a body having a periphery 133 and a plurality of flexible tabs 134 arranged around the periphery 133 of the cover 13. The flexible tabs 134 may be arranged to engage the top side of the rim 151 and bias the cover 13 against the sealing boss 152 to seal the internal space 12. That is, as shown in FIGS. 7 and 8, the cover 13 may be forced onto the rim 151 so that the flexible tabs 134 pivot outwardly to allow the rim 151 to clear the lower ends of the flexible tabs 134 and be received into a space between the flexible tabs 134 and the body. With the rim 151 positioned below the tabs 134, the tabs 134 may flex inwardly to capture the rim 151. It should be noted that although the sealing boss 152 is on the rim 151 in this embodiment, the sealing boss 152 could be positioned on the cover 13 instead. Also, in this embodiment, the cover includes a peripheral lip 135 that extends upwardly from the body around the periphery 133, and the flexible tabs 134 extend downwardly and inwardly from the peripheral lip 135. However, the flexible tabs 134 could be supported in different ways. For example, the tabs 134 could extend from the body of the cover 13 and be positioned inside of the internal space 11 to engage the sidewall of the cup 15. In this embodiment, the cup sidewall could include a ledge or step located below the rim 151 that engages with the ends of the flexible tabs 134 in a way similar to how the tabs 134 capture the rim 151.

Figure 9:
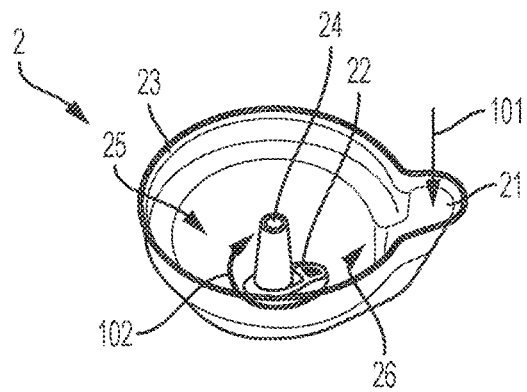
FIG. 9 shows a perspective view of the mixing funnel of the FIG. 1 embodiment.

In accordance with another aspect of the invention, the mixing funnel for use with a beverage cartridge may be arranged with a funnel body defining a bowl portion 25 having a sidewall and a bottom, e.g., as shown in FIG. 9. The bottom may include an outlet opening 22, and the sidewall may have a rim at an upper end of the sidewall and a gap 26 at a portion of the sidewall. An inlet channel 21 may extend radially from the gap 26 and be arranged to receive liquid into the inlet channel 21 in an axial direction (as shown by the arrow 101 in FIG. 9) and to direct the liquid into the bowl portion 25 through the gap 26 such that the liquid enters the bowl portion and follows an arcuate pathway around the bowl portion (as shown by the arrow 102 in FIG. 9). As noted above, the funnel body may include a spike or other pusher element 24 that extends upwardly from the bottom of the bowl portion 25 and is arranged to contact and open the beverage material container 1.

In accordance with an aspect of the invention, the outlet opening 22 may be offset from a center of the bowl portion, e.g., to a side of the pusher element 24. Such an arrangement has been found to reduce splashing of liquid in the bowl portion and aid in creating a continuous stream of beverage exiting the mixing funnel 2. In this embodiment, the inlet channel 21 has a U shape when viewed from a top side, and the inlet channel 21 has a bottom that is positioned above the bottom of the bowl portion. This arrangement of the inlet channel bottom may aid in having liquid flow downwardly into the bowl portion 25 to help drain the inlet channel 21 and create a swirling flow pattern in the bowl portion 25. As discussed above, the mixing funnel 2 may include a stepped portion 23 near the rim of the bowl portion 25 arranged to receive the beverage material container 1. That is, the stepped portion 23 may be arranged to engage the beverage material container 1 at a first position and at a second position, where the beverage material container 1 is positioned further within the bowl portion 25 in the second position than in the first position. When the beverage material container 1 is in the second position, the pusher element 24 may contact and open the beverage material container 1.

In accordance with another aspect of the invention, a beverage cartridge including a beverage material container and a mixing funnel are arranged for use in a beverage dispensing system. For example, the beverage cartridge may be received in a cartridge holder of a beverage machine arranged similarly to coffee machines that accept cartridges to form a beverage (whether coffee, tea or other beverage types). Such a beverage machine may have a cartridge holder that accepts the beverage cartridge, opens the beverage cartridge (e.g., to release beverage material), and provides water or other liquid to the cartridge to form a beverage. In one embodiment, the cartridge holder may have a hand-operated mechanism that can be opened to receive the cartridge and closed to at least partially enclose the cartridge. Closing of the cartridge holder may move the beverage material container and mixing funnel towards each other, thereby opening the beverage material container to dispense beverage material into the mixing funnel. For example, the cartridge holder may engage the container and the funnel and push the two towards each other to cause a pusher element of the mixing funnel to open the container in a way like that described above. Thereafter, water or other liquid may be dispensed into the mixing funnel for mixing with the beverage material and later dispensing of beverage.

Figure 10:
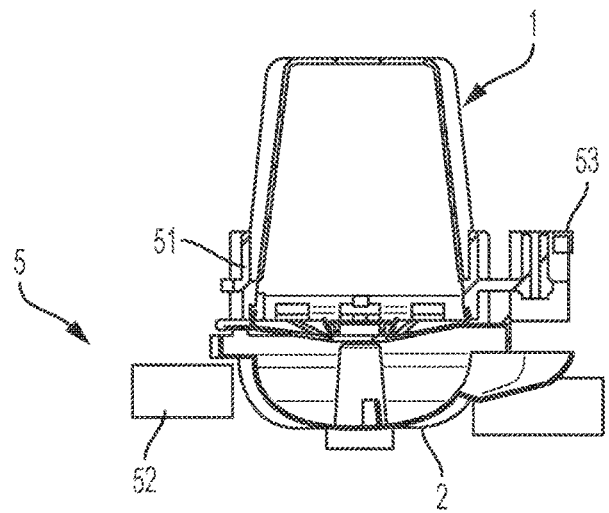
FIG. 10 shows a beverage cartridge held by a cartridge holder of a beverage making machine in an illustrative embodiment.

In one embodiment, a beverage making machine having a cartridge holder to receive the beverage cartridge may include a vibration mechanism arranged to vibrate the beverage cartridge and cause beverage material to be dispensed from the beverage cartridge into the mixing funnel. For example, FIG. 10 shows a beverage cartridge 10 received by a cartridge holder 5 of a beverage making machine. Though shown schematically, the cartridge holder 5 includes an upper portion 51 that engages with the beverage material container 1 and a lower portion 52 that engages the mixing funnel 2. In this embodiment, the upper portion 51 includes a yoke that at least partially extends around the container 1. As the cartridge holder 5 is closed, the upper and lower portions 51, 52 are moved toward each other, thereby moving the container 1 and funnel 2 towards each other and opening the container 1 to release beverage material 12 into the funnel 1. Cartridge holders 5 having upper and lower portions that receive and enclose a cartridge in this manner are widely used in coffee brewers, and any suitable arrangement may be employed.

In this embodiment, the cartridge holder 5 also includes a vibration mechanism 53 arranged to vibrate the container 1 and/or the funnel 2. The vibration mechanism 53 may include a motor with an eccentric drive that causes the yoke of the upper portion 51 to vibrate in a horizontal plane at about 135 Hz and with a 2 mm amplitude. However, other vibratory frequencies and amplitudes may be used, and the cartridge 10 may be vibrated in directions other than horizontal, such as a vertical directions and/or direction that have horizontal and vertical components. Such motion may aid in dispensing beverage material 12 from the container 1, particularly if the beverage material 12 includes a powder, such as an infant formula. During and/or after vibration of the cartridge 10, liquid may be dispensed by the machine into the mixing funnel 2 to mix with beverage material 12 dispensed from the container 1.

It should be understood, however, that vibration or other movement of the cartridge 1 need not be employed in all embodiments. For example, liquid may be delivered into the beverage material container 1 to mix with beverage material 12 in the container 1. In this case, there may be no need to dispense beverage material 12 from the container 1, and so no vibration is used. To introduce liquid into the cartridge, for example, the container 1 may be pierced by an inlet piercing element (e.g., a needle, knife, blade, etc.) so that water or other liquid may be injected into the cartridge 10. Beverage formed in the container 1 may be dispensed through an opening in the cover 13, or another part of the container 1, and the opening may be formed by piercing or other action such as that described above. Also, while not shown, the cartridge 10 may include other elements, such as one or more filters to filter beverage prior to exiting a beverage machine. A filter may be provided in the beverage material container 1, in the mixing funnel 2 (e.g., at the outlet 22), or elsewhere. Also, as used herein, "beverage" refers to a liquid substance intended for drinking that is formed when a liquid interacts with a beverage material. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Although the embodiments illustrate that the beverage material 12 is located only in a single chamber of the beverage material container 1, beverage material of one or more different types may be provided in two or more chambers of the container. For example, a cartridge may include roast and ground coffee in a first chamber, and a creamer and sweetener in the second chamber, enabling the cartridge to form a cappuccino- or latte-like beverage. In another embodiment, the first chamber may include coffee grounds and the second chamber may include a hot chocolate material, allowing the cartridge to form a mocha-type beverage. Other combinations will occur to those of skill in the art, such as leaf tea in the first chamber and a dried fruit material in the second chamber, a dried fruit material in the first chamber and creamer/sweetener in the second chamber, and so on. In some embodiments, another filter may be provided, e.g., to separate beverage media in the second chamber from the fluid outlet. Also, water or other liquid may be provided into a first chamber of the container 1 to mix with beverage material 12, while beverage material in a second chamber may be dispensed in dry or powder form into the mixing funnel 2 for mixing with beverage that exits the first chamber.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A beverage dispensing system, comprising:
  a beverage cartridge including
    a beverage material container having a beverage material in an internal space, the beverage material container including a pierceable cover, and
    a mixing funnel attached below the beverage material container to receive the beverage material released from the beverage material container and to receive a liquid that is mixed with the beverage material in the mixing funnel, the mixing funnel including a funnel body having a pusher element and a bowl portion having a sidewall and a bottom, the bottom including an outlet opening, and the sidewall having a rim at an upper end of the sidewall and a gap at a portion of the sidewall, the mixing funnel including an inlet channel extending radially from the gap to receive the liquid into the inlet channel in an axial direction and to direct the liquid into the bowl portion such that the liquid enters the bowl portion and follows an arcuate pathway around the bowl portion, wherein the beverage material container and the mixing funnel are movable towards each other along the axial direction while remaining attached together to cause the pusher element to open the cover of the beverage material container and release the beverage material into the mixing funnel; and a beverage making machine having a cartridge holder to receive the beverage cartridge, the cartridge holder including a vibration mechanism to vibrate the beverage cartridge and cause the beverage material to be dispensed from the beverage cartridge into the mixing funnel.

2. The system of claim 1, wherein the vibration mechanism includes a yoke that extends at least partially around the beverage material container and transmits vibratory motion to the beverage material container.

3. The system of claim 2, wherein the vibration mechanism includes a motor that moves the yoke in a horizontal plane.

4. The system of claim 2, wherein the vibration mechanism includes a motor with an eccentric drive linked between the motor and the yoke.

5. The system of claim 1, wherein the cartridge holder is arranged to vibrate the beverage cartridge while dispensing the liquid into the mixing funnel to mix with the beverage material.

6. The system of claim 1, wherein the cartridge holder is arranged to move the beverage material container and the mixing funnel toward each other to open the beverage material container.

7. The system of claim 1, wherein the cartridge holder is arranged to hold the beverage cartridge in an orientation with the beverage material container positioned over the mixing funnel such that the beverage material dispensed from the beverage material container falls into the mixing funnel.

8. The system of claim 1, wherein the pusher element extends upwardly from the bottom of the bowl portion.

9. The system of claim 1, wherein the beverage material container is configured such that movement of a portion of the beverage material container into the mixing funnel causes the pusher element to open the cover.

10. The system of claim 1, wherein the cover includes one or more break lines, and the pusher element is positioned to contact the cover and cause the one or more break lines to open in response to movement of the beverage material container toward the mixing funnel.

11. The system of claim 10, wherein the pusher element extends upwardly from the bottom of the bowl portion.

12. The system of claim 10, wherein the cover includes a movable portion located between two stationary portions, the movable portion joined to the two stationary portions by at least one break line, and wherein the pusher element is positioned to contact and move the movable portion.

13. The system of claim 10, wherein the one or more break lines include perforations, scoring or thinned sections of the cover.

14. The system of claim 1, wherein the beverage material is a powder.

15. The system of claim 1, wherein the beverage material container is movable relative to the mixing funnel from a first position in which the internal space is closed to a second position in which the internal space is opened to release the beverage material, and wherein the beverage cartridge includes a detent that operates to maintain the beverage material container at the first position in the absence of an external force, and permits the beverage material container to move to the second position only if an external force exceeding a threshold force is applied to the beverage material container and mixing funnel.

* * * * *